US008943473B1

(12) United States Patent
Duraisamy et al.

(10) Patent No.: US 8,943,473 B1
(45) Date of Patent: Jan. 27, 2015

(54) CONSISTENTLY DELIVERING A WEB PAGE HAVING SOURCE CODE WITH A DYNAMIC INSTRUCTION

(71) Applicant: Google Inc., Mountain View, CA (US)

(72) Inventors: Sandeesh Kumar Duraisamy, Sunnyvale, CA (US); Arvind Jain, Los Altos, CA (US)

(73) Assignee: Google Inc., Mountain View, CA (US)

( * ) Notice: Subject to any disclaimer, the term of this patent is extended or adjusted under 35 U.S.C. 154(b) by 43 days.

(21) Appl. No.: 13/661,751

(22) Filed: Oct. 26, 2012

Related U.S. Application Data

(60) Provisional application No. 61/595,609, filed on Feb. 6, 2012.

(51) Int. Cl.
 *G06F 9/44* (2006.01)
(52) U.S. Cl.
 USPC .......................................................... 717/111
(58) Field of Classification Search
 None
 See application file for complete search history.

(56) References Cited

U.S. PATENT DOCUMENTS

| | | | |
|---|---|---|---|
| 6,901,438 B1 | 5/2005 | Davis et al. | |
| 8,473,916 B2* | 6/2013 | Venkatraman et al. | 717/124 |
| 2004/0210653 A1* | 10/2004 | Kanoor et al. | 709/223 |
| 2008/0282235 A1* | 11/2008 | Jadhav et al. | 717/131 |
| 2011/0307238 A1* | 12/2011 | Scoda | 703/26 |
| 2011/0314091 A1* | 12/2011 | Podjarny | 709/203 |
| 2012/0192153 A1* | 7/2012 | Venkatraman et al. | 717/124 |
| 2013/0198607 A1* | 8/2013 | Mischook et al. | 715/234 |

OTHER PUBLICATIONS

Mickens, J., et al., "Mugshot: Deterministic Capture and Replay for Javascept Applications," in *Proceedings of the 7th USENIX Conference on Networked Systems Design and Implementation (NSDP'10)*, USENIX Association, United States (2010), 15 pages.
Nino, I.J., et al., "CARENA: A Tool to Capture and Replay Web Navigation Sessions," in *Proceedings of the End-to-End Monitoring Techniques and Services on 2005. Workshop (E2EMON '05)*, IEEE Computer Society, United States (2005), 15 pages.
Richards, Gregor, et al., "An Analysis of the Dynamic Behavior of JavaScript Programs," in *Proceedings of the 2010 ACM SIGPLAN Conference on Programming Language Design and Implementation (PLDI '10)*, ACM, United States (2010), 12 cages.
Richards, Gregor, et al., "Automated Construction of JavaScript Benchmarks," in *Proceedings of the 2011 ACM International Conference on Object Oriented Programming Systems Languages and Applications (OOPSLA '11)*, ACM, United States (2011), 17 pages.

\* cited by examiner

*Primary Examiner* — Philip Wang
(74) *Attorney, Agent, or Firm* — Fish & Richardson P.C.

(57) ABSTRACT

According to some implementations, a method, system and computer program product for consistently delivering a web page having source code with a dynamic instruction is provided. The method begins with a copy of the source code being stored and analyzed to identify the dynamic instruction. A uniformity profile of the web page is generated based on the analyzing, the uniformity profile specifying a modification to a portion of the dynamic instruction to maintain consistent delivery of the web page. The portion of the dynamic instruction is modified based on the uniformity profile, and the first modified copy of the source code is delivered to a client. The portion of the dynamic instruction is modified based on the uniformity profile, resulting in a second modified dynamic instruction. Finally, a second modified copy of the source code is delivered to a client.

20 Claims, 9 Drawing Sheets

```
Web Page Source 610

<SCRIPT LANGUAGE="JavaScript"> randomImages[0] = '1.gif'
randomImages[1] = '2.gif'
randomImages[2] = '3.gif'
randomImages[3] = '4.gif' var j = 0
var p = randomImages.length;
var preBuffer = new Array()

for (i = 0; i < p; i++){
   preBuffer[i] = new Image()
   preBuffer[i].src = randomImages[i]
} var whichImage = Math.round(Math.random()*(p-1));

function showImage(){
document.write('<img src="'+randomImages[whichImage]+'">');
}

</script>
                                                              620
```

```
<P>The quick brown fox jumped over the lazy dog.  The quick
brown fox jumped over the lazy dog.  The quick brown fox
jumped over the lazy dog.</P>                                 630
```

```
<SCRIPT LANGUAGE="JavaScript"> showImage();

</script>                                                     640
```

622 → (braces around randomImages[0..3] lines)
624 → (braces around whichImage and showImage function)

CONSISTENTLY DELIVERING A WEB PAGE HAVING SOURCE CODE WITH A DYNAMIC INSTRUCTION

CROSS REFERENCE TO RELATED APPLICATIONS

This application claims the benefit of U.S. Provisional Patent Application No. 61/595,609, filed. Feb. 6, 2012, entitled "Consistently Delivering a Web Page Having Source Code With a Dynamic Instruction," which is incorporated herein in its entirety by reference.

BACKGROUND

Modern web pages have a variety of different content components. Based on dynamic instructions in a web page, the content displayed by a web page can change substantially each time a client 'visits' the web page. One example of source code that can be used to cause content components to change for each serving of a web page is JavaScript. Specifically, date and random functions can be used in JavaScript to dynamically cause changes to a web page each time it is delivered. Using these dynamic functions, different content can be delivered for each date, or based on a random number.

Many different reasons exist for storing a copy of a web page for reuse without having to access the original version. In one approach to storing a web page, the source code of the web page, and content items referenced by the page are stored on a server for use at a later time. In this approach, when storing a copy of a web page, dynamic functions are stored along with the source code of the page.

When conventionally using the stored copy of the web page at a later time, when the stored web page is delivered, the stored dynamic instructions are executed, potentially leading to substantial changes in some content items displayed by the web page. These changes can impact different uses of the stored web page.

BRIEF SUMMARY

Implementations described herein relate to consistently delivering a web page having source code with a dynamic instruction. According to some implementations, the method begins with a copy of the source code being stored. The stored copy of the source code is analyzed to identify the dynamic instruction. A uniformity profile of the web page is generated based on the analyzing, wherein the uniformity profile specifies a modification to a portion of the dynamic instruction to maintain consistent delivery of the web page. The portion of the dynamic instruction is modified based on the uniformity profile, resulting in a first modified dynamic instruction. A first modified copy of the source code having the first modified dynamic instruction is delivered to a client. The portion of the dynamic instruction is modified based on the uniformity profile, resulting in a second modified dynamic instruction. Finally, a second modified copy of the source code having the second modified dynamic instruction is delivered to a client.

A system to consistently deliver a web page having source code with a dynamic function includes a profiled web content storer configured to store a copy of the source code and an analyzer configured to analyze the stored copy of the source code to identify the dynamic function. A profile generator is configured to generate a uniformity profile of the web page based on the analyzing, with the uniformity profile specifying a dynamic function to modify to maintain consistent delivery of the web page. A source modifier is configured to replace the dynamic function with a replacement function based on the uniformity profile, resulting in a modified web page source. Finally, a consistent web content server is configured to deliver the modified web page source to a client.

Further features and advantages, as well as the structure and operation of various implementations are described in detail below with reference to the accompanying drawings.

One or more of the following implementations described below can have one or more of the following advantages: improving the accuracy of testing the delivery of web pages having dynamic instructions, improving the accuracy of testing the processing of dynamic instructions in web pages, and simplifying the storage and delivery of web pages having dynamic content. This list of example advantages of different implementations is intended to be non-limiting, and other advantages would be apparent to one having skill in the relevant art(s), given the description herein.

BRIEF DESCRIPTION OF THE FIGURES

Implementations of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF IMPLEMENTATIONS

The following detailed description of the implementations refers to the accompanying drawings that illustrate implementations consistent with this invention. Other implementations are possible, and modifications may be made to the implementations within the spirit and scope of the invention. Therefore, the detailed description is not meant to limit the invention. Rather, the scope of the invention is defined by the appended claims.

The implementation(s) described and references in the specification to "one implementation," "an implementation," "an example implementation," etc., indicate that the implementation (s) described may include a particular feature, structure, or characteristic. However, every implementation may not necessarily include the particular feature, structure or characteristic. Moreover, such phrases are not necessarily referring to the same implementation. When a particular feature, structure or characteristic is described in connection with an implementation, it is understood that it is within the knowledge of one skilled in the art to effect such feature, structure, or characteristic in connection with other implementations, whether or not explicitly described.

It would be apparent to one of skill in the relevant art that the implementations described below can be implemented in many different implementations of software, hardware, firmware, and/or the entities illustrated in the figures. Any actual software code with the specialized control of hardware to instantiate implementations is not limiting of this description. Thus, the operational behavior of implementations is described with the understanding that modifications and variations of the implementations are possible, given the level of detail presented herein.

Overview

When a software developer is testing how various changes to a system affect the load time of a web page, it is important for the web page to be consistent each time it is delivered. However, many web sites include dynamic content that changes each time it is delivered. Based on this changing content, it can be difficult for a developer to determine whether load time changes due to the dynamic content or the changes made to the system. The process of performance measurement can benefit from a consistent testing environment. Because web pages having dynamic content can load different content every time they are accessed, maintaining a consistent testing environment for these types of web pages can be challenging.

Generally speaking, some implementations described herein consistently deliver a stored web page having source code with dynamic instructions. As described below, some implementations use the consistent delivery of the stored web page to test the performance of applications associated with the delivery and use of the stored web page.

Figure 1:
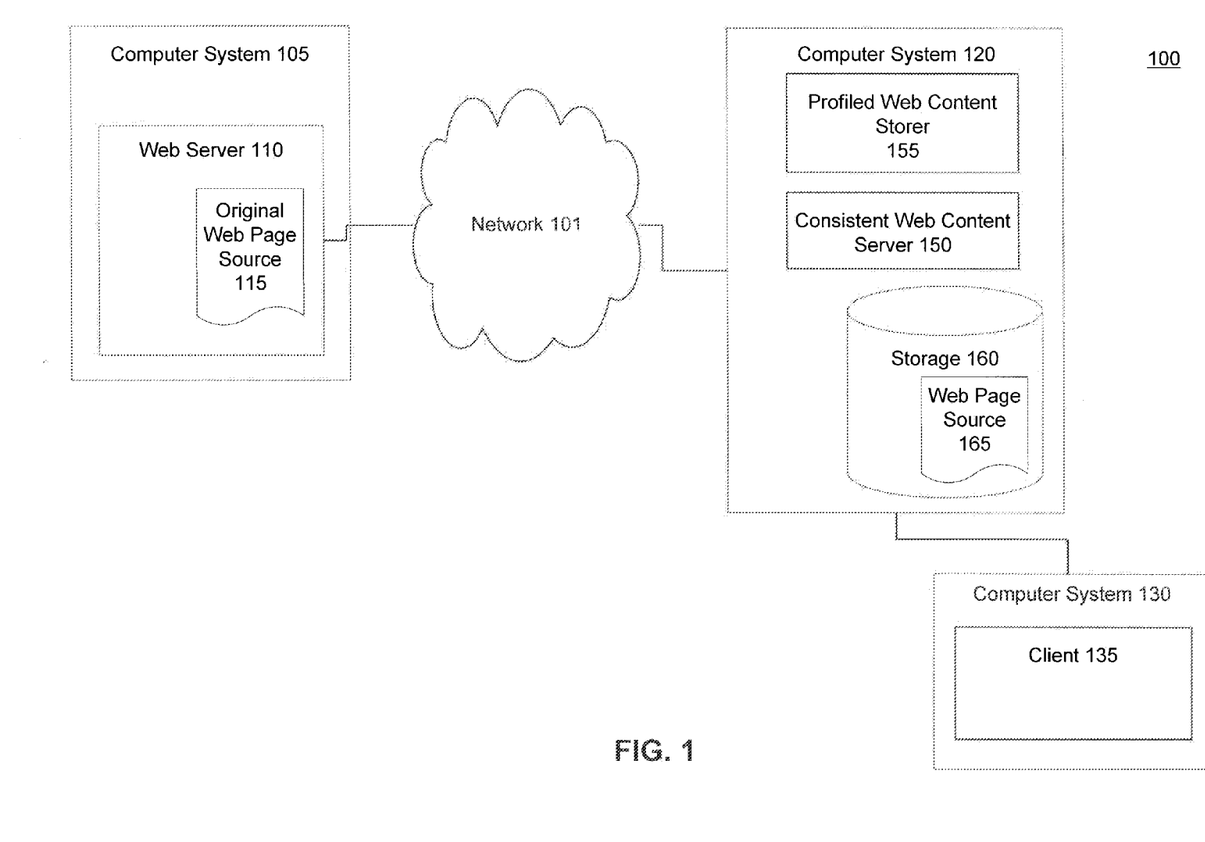
FIG. 1 is a block diagram of a network architecture having a web server, a consistent web content server and a client, according to some implementations.

FIG. 1 is a block diagram of a computer system architecture 100 having computer system 105, computer system 120 and computer system 130. Computer system 120 includes consistent web content server 150, profiled web content storer 155 and storage 160 having web page source 165. Computer system 105 is coupled to computer system 120 via network 101 and includes web server 110 having original web page source 115. Computer system 120 is also coupled to computer system 130 having client 135.

As discussed with the description of FIG. 7 below, in some implementations, client 135 is a combination of a web browser and a performance measuring application configured to measure the performance of the web browser. As further described with respect to the discussion of FIG. 7 below, having a consistently delivered web page can improve the accuracy of the performance measuring application by removing other unmeasured factors. In other implementations, client 135 can be any application that is configured to receive a web page source.

Network 101 may be any network or combination of networks that can carry data communication. Such network 101 can include, but is not limited to, a local area network, medium area network, and/or wide area network such as the Internet. Network 101 can support protocols and technology including, but not limited to, World Wide Web protocols and/or services. Intermediate web servers, gateways, or other servers may be provided between components of computer system architecture 100 depending upon a particular application or environment. Computer systems 105, 120 and 130 are discussed further in the description of FIG. 9 below.

Consistent web content server 150 is configured to consistently deliver a web page to client 135. As used typically herein, to 'consistently' deliver a web page means, for the same stored web page source code, to deliver web page source code to an application that uses the code to display the same content each time the stored version is used—regardless of dynamic instructions within the source code.

For example, a stored web page that includes a graphic banner advertisement may include a dynamic instruction that changes the graphic each time the page is displayed based on a random number. At a web browser, during delivery of the stored web page to a display, the dynamic instruction is interpreted, and a random number is used to select a graphic displayed by the page. Based on the random number, this displayed content can be different than the content originally displayed by the stored web page source.

As used typically herein, delivery of the web page includes delivery by the web server to a client application and interpretation of dynamic instructions by the client application. The timeline of request, delivery and dynamic code interpretation is discussed further in the description of FIG. 4 below.

Recording the Web Page

Figure 2:
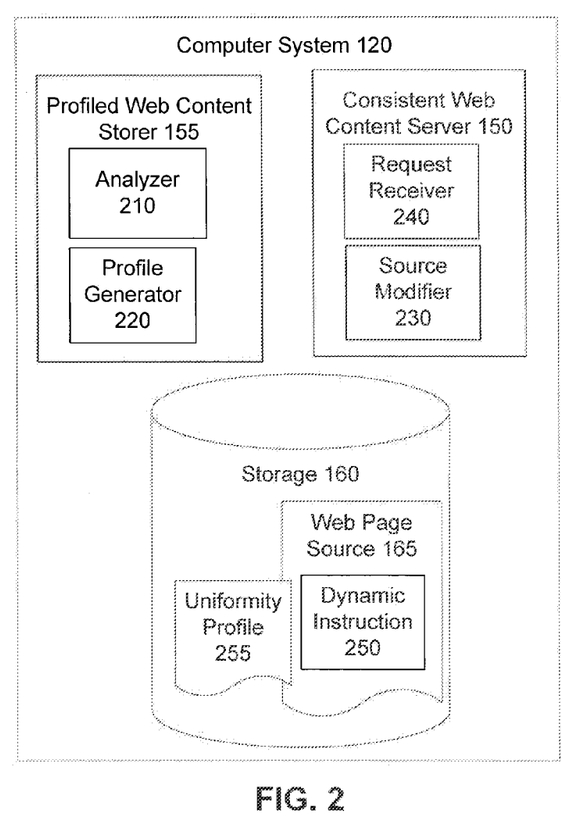
FIG. 2 is a block diagram of a more detailed view of a profiled web content storer and a consistent web content server, according to some implementations.

FIG. 2 is a block diagram of a more detailed view of a consistent web content server 150 and profiled web content storer 155, as hosted by computer system 120, according to some implementations. Consistent web content server 150 includes analyzer 210, profile generator 220 and source modifier 230. Profiled web content storer 155 includes analyzer 210 and profile generator 220. Computer system 120 further includes a storage 160 having web page source 165 and uniformity profile 255. Web page source 165 includes dynamic instruction 250.

For convenience, as described herein, the storage of original web page source 115 by profiled web content storer 155 is termed recording the displayed web page, with the displayed web page being the result of the rendering of original web page source 115 by profiled web content storer 155. Beyond simply storing the web page source and content generated by original web page source 115, profiled web content storer 155 stores content that forms the web page—including content retrieved based on dynamic instructions. The discussion of FIGS. 3A-B below describes the storage of recorded original web page source 115.

Stages S1-S2 listed below are intended to be a non-limiting example of steps performed by operation of some implementations. One having skill in the relevant art(s), given the description herein, will appreciate that some steps can be performed in a different order, by different components and have different results than the descriptive steps below. Stages S1-S2 are as follows:

S1. Original web page source 115 is selected as a web page to be stored for use by some implementations. Web page source 115 can be a part of a larger collection of linked web pages (a web site), and reference content items not shown.

S2. Based on the selection of original web page source 115, profiled web content storer 155 records original web page source 115 and stores web page source 165, as well as a portion of the content items referenced by web page source 115 (not shown). Profiled web content storer 155 stores all stored items in storage 160. One having skill in the relevant art(s) will appreciate different approaches used to store web page source 165 and associated content items.

Figure 3A:
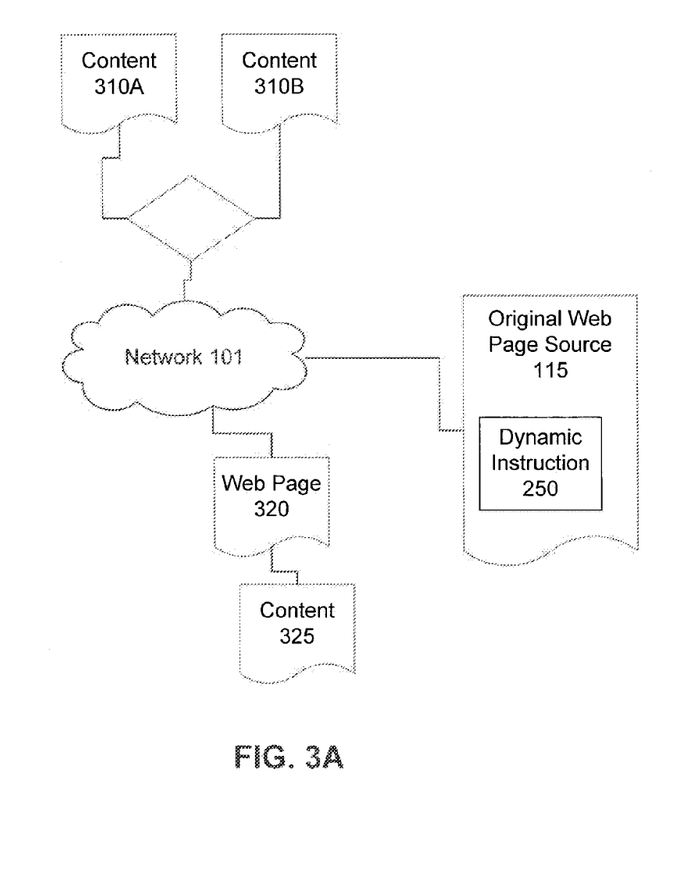
FIG. 3A is a diagram of conventional distributed storage Of a web page having dynamic content.

FIG. 3A is a diagram of storage of a web page having dynamic content. Original web page source 115 has a link to web page 320 and dynamic links to content 310A-B. Web page 320 has a link to content 325. In this example, original web page source 115 is configured to use web page 320 to display content 325 and one of content 310A and 310B when original web page source 115 is rendered. Dynamic instruction 250 is configured to select either content 310A or content 310B for display on the rendered version of original web page source 115. As noted above, dynamic instruction 250 can use a random function or a date function, for example, to select between content 310A-B.

Figure 3B:
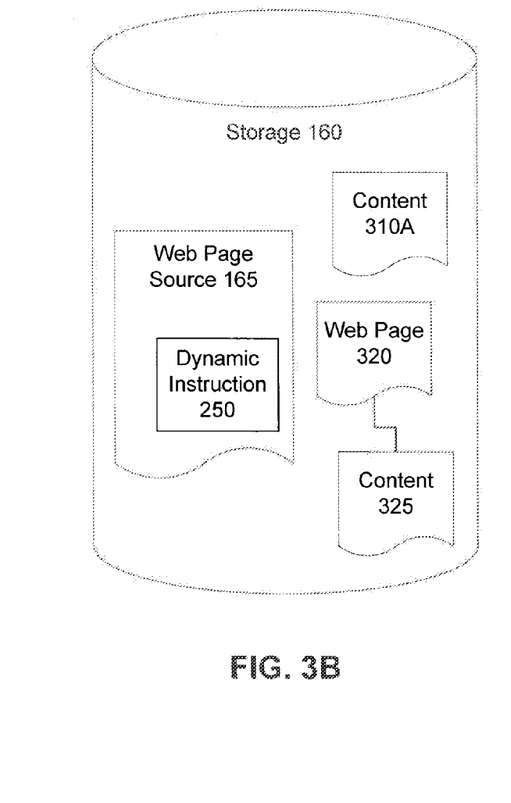
FIG. 3B is a diagram of storage of the web page having dynamic content for use by a consistent web content server, according to some implementations.

FIG. 3B is a diagram of storage of the web page having dynamic content stored for use by a consistent web content server, according to some implementations. Storage 160 holds web page source 165, content 310A and web page 320 linked to content 325.

Continuing the example above, when some implementations of profiled web content storer 150 record original web page source 115, portions of items from FIG. 3A are stored in storage 160. As noted above with the discussion of FIG. 3A, original web page source 115 is configured to use web page 320 to display content 325 and one of content 310A and 310B when original web page source 115 is rendered. At the time profiled web content storer records original web page source 115, dynamic instruction 250 is used to select content 310A for display. This selection may be based, for example, on the date of playing or a random number selected.

Based on the recording of original web page source 115, profiled web content storer 150 stores a copy of original web page source 115 as web page source 165. Also because original web page source 115 is configured to use web page 320 and content 325, these items are stored in storage 160. Because content 310A is selected by dynamic instruction 250, content 310A is also stored in storage 160. Profiled web content storer 150 continues to record original web page source 115 until all of the content items referenced by the page are stored in storage 160.

As would be appreciated by one having skill in the relevant art(s), given the description herein, because of the nature of dynamic instructions, content 310B may not be identifiable to profiled web content storer 150 at the time of storing. For example, dynamic instruction 250 may only explicitly reference content 310B on a particular date of after a particular random number is selected.

In a conventional approach to storing original web page source 115, when web page source 165 is played back, dynamic instruction 250 can refer to content 310B instead of stored content 310A. Because some implementations of client 135 are not connected to the Internet, content 310B would be unavailable to client 135 and would thus lead to an error. Because of this missing content, a performance monitor measuring the operation of client 135 would not be able to repeatedly test web page source 165 consistently.

As further discussed with the descriptions of FIGS. 4-7 below, some implementations approach the playback of web page source 165 so as to maintain consistency in playback. This consistency is illustrated in an example where, notwithstanding the above-noted configuration of dynamic instruction 250, content 310A is repeatedly played back.

Generating a Profile of Stored Web Content

One approach to maintaining consistent delivery of web page source 165 having dynamic instruction 250 is to generate a profile of web page source 165 and dynamic instruction 250. It is important to note that, as used typically herein, dynamic instruction 250 can be a combination of web page code/instructions that lead to inconsistent results when web page source 165 is conventionally replayed. In an approach used by some implementations, a profile is generated that can be repeatedly used to handle dynamic instruction 250 and consistently replay web page source 165.

During or after the operation of profiled web content storer 150, in some implementations, analyzer 210 analyzes web page source 165 to generate uniformity profile 255. Based on the analysis of analyzer 210, profile generator 220 generates a profile of web page source 165 as stored in storage 160. To generate uniformity profile 255, different implementations identify aspects of dynamic instruction 250 that may alter the rendering of web page source 165 when it is repeatedly replayed by client 135. As noted above, changes in the rendering of stored web page source 165 upon reuse can have negative consequences for certain actions applied to the rendering, e.g., measuring web browser performance.

An example uniformity profile indicates specific changes to be made to dynamic instruction 250 that prevent an alteration in the rendering of web page source 165 when it is repeatedly replayed by client 135. Uniformity profiles used by some implementations include different characteristics, including a specific date-time, a specific random number seed, and/or a list of changing URI (Uniform Resource Identifier) parameters.

In some implementations, a date-time value stored in uniformity profile 255 can provide a consistent date for use when web page source 165 is repeatedly replayed by client 135. Allowing the date-time value to change at each replaying could cause inconsistent results for each execution of dynamic instruction 250 in web page source 165. A stored date-time value can be used to replace a current date-time value in any portions of dynamic instruction 250 that uses such information. Using the stored date-time value in uniformity profile 255 during the execution of dynamic instruction 250 can prevent an inconsistent result.

In other implementations, a random number seed stored in uniformity profile 255 can provide a consistent number from a random number request when web page source 165 is repeatedly replayed by client 135. Providing a different number at each replaying could cause inconsistent results for each execution of dynamic instruction 250 in web page source 165. Generally, although the request is for a random number, the random number is typically chosen according to a given algorithm. Use of a random number seed as an input into the algorithm in place of a random seed can result in consistent, repeatable results from the algorithm. Accordingly, using the stored random number seed in uniformity profile 255 during the execution of dynamic instruction 250 can prevent an inconsistent result.

In other implementations, URI parameters stored in uniformity profile 255 can provide consistent parameters for execution when web page source 165 is repeatedly replayed by client 135. Providing different parameters at each replaying could cause inconsistent results for each execution of dynamic instruction 250 in web page source 165. Example execution parameters are provided with reference to FIG. 5 below. Using the stored URI parameters in uniformity profile 255 during the execution of dynamic instruction 250 can prevent an inconsistent result.

More detailed descriptions of changes that can be made to dynamic instruction 250 based on a uniformity profile 255 are described with reference to the descriptions of FIGS. 4, 5 and 6 below.

Consistent Delivery

Figure 4:
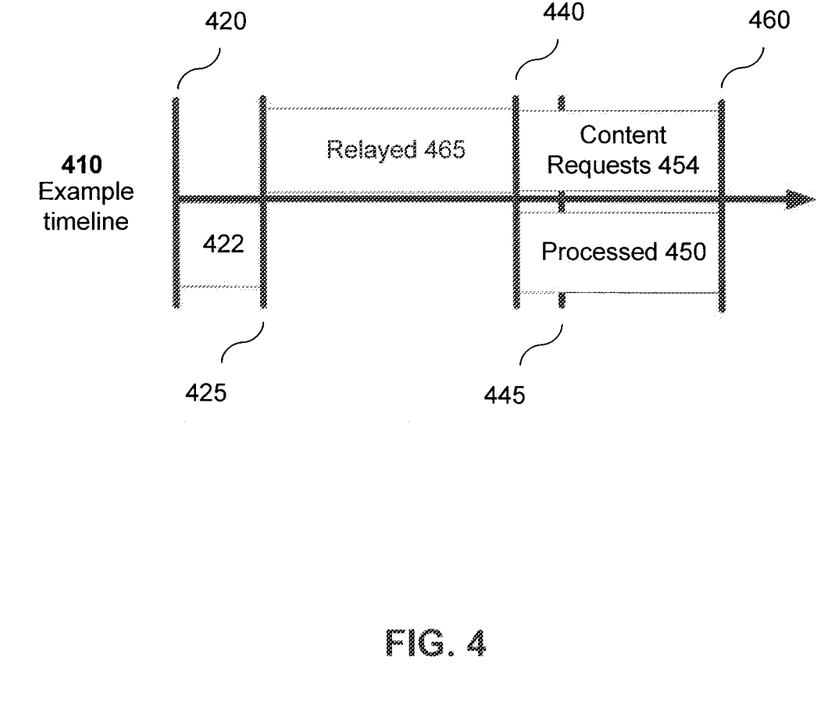
FIG. 4 is a timeline showing aspects of some implementations.

FIG. 4 is an example timeline 410 that illustrates aspects of some implementations. Referring to components in FIGS. 1 and 2, timeline 410 illustrates different milestones of the delivery and replaying of stored web page source 165 by a client, according to some implementations. In this example, stored web page source 165 includes dynamic instruction 250.

Requested Page Modification

Stages M1-M7 listed below provide an example of an approach that provides a consistent delivery of web page source 165 by modifying the requested page source each time it is requested. The same web page source 165 is stored and reused, but each time, after being requested, the page is modified before delivery. Stages M1-M7 are listed below with reference to FIGS. 1, 2 and 4:

M1. At point 420, a request for web page source 165 is received at consistent content web server 150 from client 135. In this example, client 135 is a web browser application. Consistent content web server 150 identifies web page source 165 as having dynamic content and retrieves uniformity profile 255. Uniformity profile 255 was generated for web page source 165 by the profiling process described above.

M2. In response to the request, during interval 422, in some implementations, consistent web content server 150 modifies web page source 165 based on uniformity profile 255 to maintain consistency in the delivery of web page source 165 to client 135. To make the modification, for example, uniformity profile 255 contains a reference to dynamic instruction 250 along with a change required to prevent inconsistent delivery. Instead of changing each time dynamic instruction 250 is interpreted, after web page source 165 is modified based on uniformity profile 255, the modified web page source 165 is consistently delivered each time, without changes.

One approach to modifying web page source used by some implementations, is to reuse uniformity profile 255 each time stored web page source 165 is provided. As noted above, a uniformity profile can include specific date-time, a specific random number seed, and/or a list of URI parameters.

When the dynamic instruction is based on a date, the uniformity profile stored date-time is provided. When a random number is used, the random number seed stored in the uniformity profile is provided. When URI parameters are used, the uniformity profile can provide the same URI parameters each time the page is requested. Additional examples of uniformity profile 255 and modification of dynamic instruction 250 are discussed with reference to the description of FIG. 6 below.

M3. After the modification of stage M2, at point 425, a stored copy of web page source 165 is relayed 465 to client 135 by consistent content web server 150.

M4. in this example, by the normal operation of client 135 web browser, once received at point 440, web page source 165 is processed during time 450 by a web browser processing engine.

M5. During the period that web page source 165 is processed 450, at point 445, dynamic instruction 250 is processed. Without the modification of stage M2 above, at point 445, dynamic instruction 250 could generate an inconsistent result based on some factor. However, because of the modification described in stage M2, during processing at point 445, dynamic instruction 250 generates the same result each time web page source 165 is processed by client 135.

For example, where a dynamic instruction refers to a date, the modifications described with M2 above ensure that a consistent date is used when executing the dynamic instruction. In another example, where a dynamic instruction refers to a random number, the modifications described with M2 above ensure that the same number is used when executing the dynamic instruction. In another example, where a dynamic instruction refers to URI parameters, the modifications described with M2 above ensure that the same URI parameters are used when executing the dynamic instruction.

M6. During the processing at time 450 of web page source 165, by the normal operation of a web browser, content requests 454 are generated. As would be appreciated by one having skill in the relevant art(s), content requests are generated based on markup commands in web page source 165. For example, to place a banner advertisement on a web page, web page source 165 includes a markup reference to retrieve a graphic from an external source. The address of the retrieved graphic can change based on dynamic instruction 250. In conventional web page delivery, this dynamic changing of remote addresses for content retrieval is a key source of inconsistently delivered web pages.

M7. Because of the modifications described at stage M2, the content requests 454 generated by the interpretation at point 445 of dynamic instruction 250 are the same each time web page source 165 is processed. At point 460, web page source 165 completes processing 450.

As would be appreciated by one having skill in the relevant art(s), given the description herein, different stages M1-M7 may be performed by some implementations. Additional or fewer stages can be performed, and stages can be performed in a different order than those listed.

Figure 5:
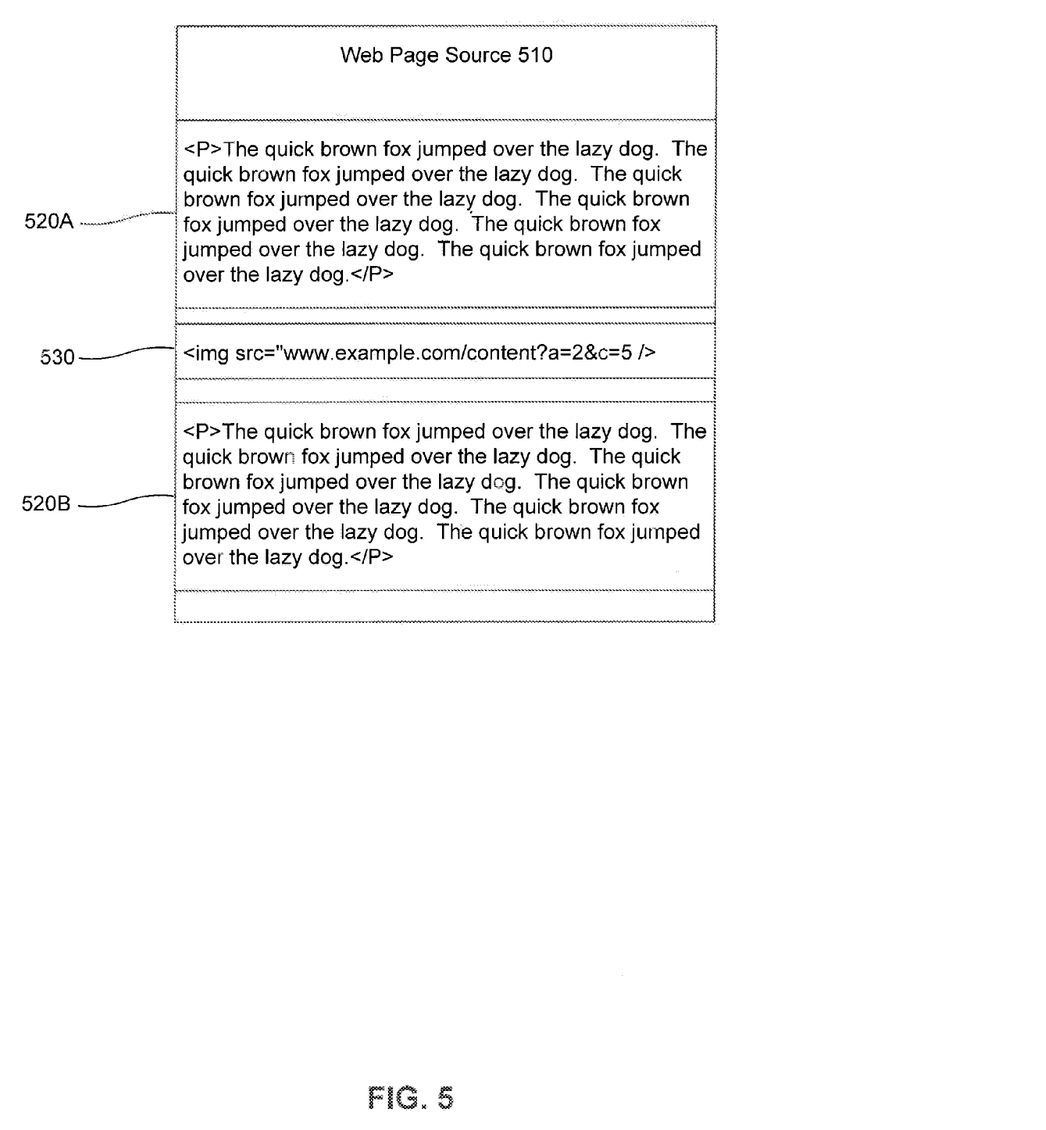
FIG. 5 is an example of the web page source of a web page having dynamic content.

FIG. 5 is an example of web page source 510 having static content 520A-B and parameterized content 530. While parameterized content 530 is not a dynamic content statement, web page automation can alter the parameters and make this statement dynamically display different content. As used typically herein therefore, this type of parameterized content 530 statement is termed a dynamic instruction.

As noted above, with reference to stage M2, in response to the request by client 135, during interval 422, in some implementations, consistent web content server 150 modifies web page source 165 to maintain consistency in the delivery of web page source 165 to client 135.

In some implementations, a type of change that can be performed in stage M2 above to maintain consistent delivery of the web page involves making a change to a portion of the dynamic instruction. As would be appreciated by one having skill in the relevant art(s), given the description herein, one portion of a dynamic instruction that can be the source of changes in a dynamic instruction is a parameter of the dynamic instruction. For example, the following Uniform Resource Indicator (URI) of parameterized content 530 has a domain name path and two parameters:

www.example.com/content?a=4&c=5

In an example web page, web content returned from the above URI changes based on the parameters used. Tne parameters "a=4&c=5" are a querystring and the destination to Which the URI is directed (www.example.com/content) returns a different piece of content (e.g., an image), based on the values for "a" and "c". One approach used by dynamically changing web pages is to vary the values in a querystring to return different content items.

Parameter Substitution

To maintain consistent delivery of the example web page described above, some implementations identify the parameters that change for each web page request using analyzer 210, and generates uniformity profile 255 using profile generator 220. Having uniformity profile 255 available allows the alteration of the parameters by source modifier 230 each time the web page is replayed by consistent web content server 150. To enable the parameter substitution, an example uniformity profile 255 includes references to the changing parameters along with new parameter values to be substituted.

Stages P1-P4 below illustrate an example of the parameter substitution described above. Stages P1-P4 are as follows:

P1. During the profiling of original web page source 510, a reference that uses a dynamically changed parameter can be identified by profile generator 220. In the example depicted on FIG. 5, the URI portion of parameterized content 530 can be identified, with the parameters "a=4&c=5". Based on this identification, profile generator generates a profile of original web page source 115.

P2. The parameters stored with the URI portion of parameterized content 530 ("a=4&c=5") return content 310A for example, from automation at www.example.com. Du ng the storage phase, this content 310A item is stored in storage 160.

P3. In an example, because the parameters are configured to be changed based on the date of the web page request, after storage as web page source 165, when web page source 165 is requested by client 135, if the date is different from the date web page source 165 was stored, then the parameters of the URI portion of parameterized content 530 will change, e.g., "a=5&c=6". As noted above, these new parameters are stored for reuse in uniformity profile 255.

P4. Thus, when stored web page source 165 is played back the following URI is generated:

www.example.com/content/"a=5 &c=6"

If left unchanged, in an example, the above URI would link to content 310B instead of the stored content 310A. By changing the URI back to the original parameter values ("a=4&c=5") before the web page is delivered, according to a stored uniformity profile described above, some implementations use content 310A to consistently playback of web page source 165.

In another approach to parameter substitution, in replay mode when different, dynamic requests are generated for different content items, these requests are analyzed, and instead of displaying different content items, a similar content item can be displayed every time the stored web page is delivered to client 135.

In this approach, when the server requests a URI, the requested URI is compared to the paths of all of the stored content items in storage 160 that have similar paths (e.g., content 310A and content 325). As used typically herein, URI path means the URI without query parameters, e.g., www.example.com/content. The iteration can find all possible content items referenced by parameters "a" and "c". In this case, a has values 2 and 4 and c has value 5.

In this example, once multiple possible URIs are constructed from different combination of values of "a" and "c", one of the combinations corresponds to the URI www.example.com/content?a=2&c=5 which points to content 310A. Content 310A is present in storage 160 and can thus be consistently displayed each time the page is requested.

This retrieval of similar content can also enable the consistent deliver of web page content.

Function Overriding

In a variation of the approach described with reference to timeline 410 and stages M1-M7 above, instead of modifying dynamic instruction 250 during interval 2 each time web page source 165 is requested, web page source 165 is permanently modified in storage 160. In this approach, the dynamic functions that cause the changing character of dynamic instruction 250 are replaced with functions that do not change. For example, a date function that causes a different content item to be displayed each time web page source 165 is replayed can be replaced (also known as overridden) by an alternative date function that returns the same value each time. In another example, a random function that causes a different content item to be displayed each time web page source 165 is replayed can be replaced (also known as overridden) by an alternative random function that returns the same value each time.

Figure 6:
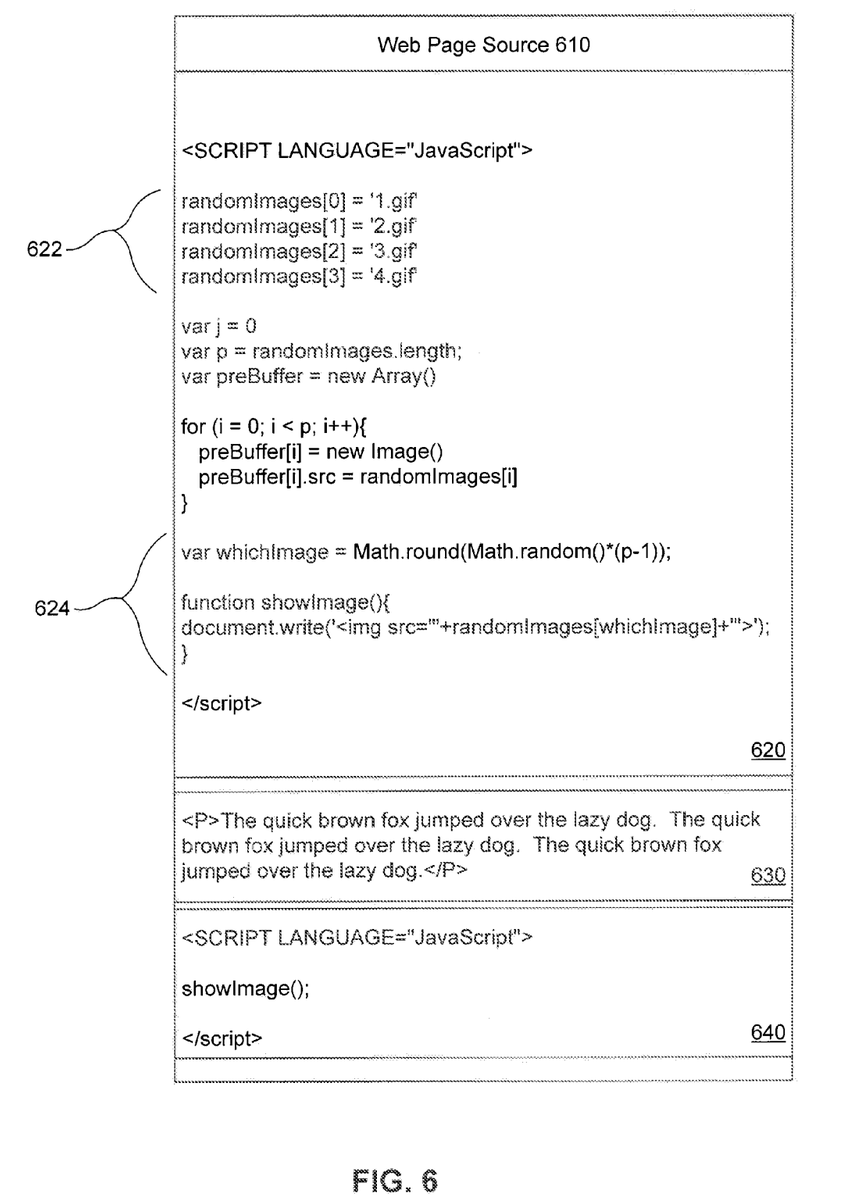
FIG. 6 is another example of the web page source of a web page having dynamic content.

FIG. 6 is an example of web page source 610 having static content 630 and JavaScript sections 620 and 640. JavaScript section 620 has image sources 622 and dynamic instructions 624, and JavaScript section 640 invokes dynamic instructions 624. Dynamic instructions 624 include requesting the display of one of a set of four random images 622: 1.gif, 2.gif, 3.gif and 4.gif. In this example, dynamic instructions 624 use a Math.random function in JavaScript to generate the random number that selects from the four images noted above.

With reference to the timeline in FIG. 4, the example below illustrates an example of the function overriding approach used by some implementations.

At point 420 in FIG. 4, a request for the web page is received at consistent content web server 150 from client 135. In response to the request, during interval 422, in some implementations, consistent web content server 150 modifies web page source 165 to maintain consistency in the delivery of web page source 165 to client 135. Instead of changing each time dynamic instruction 250 is interpreted, after web page source 165 is modified, web page source 165 is consistently delivered each time, without changes.

In some implementations, the use of the Math.random function for content selection can be detected by analyzer 210 during the profiling phase and the code that executes the Math.random function can be replaced. During the initial recording phase, the random number selected and/or the content item selected can be stored in uniformity profile 255 by profile generator 220. In this example, uniformity profile 255 also includes a reference to the included Math.random function along with a replacement static function to be used each time the web page is requested.

To maintain consistency in the playback of web page source 165, source modifier 230 replaces the Math.random function in web page source 610 with a static function. For a date function, for example, the replacement static function can return the same date each time the function is called. For a random function, the function can return the same value each time the function is called. (function not shown). Based on uniformity profile 255, the replacing (also termed overriding) can be performed by replacing function defining code in the head portion of web page source 610.

As would be appreciated by one having skill in the relevant art(s), given the description herein, other dynamic functions can be overridden by implementations in a similar fashion. As noted above, without replacement, the dynamic functions discussed above have the potential for causing inconsistent web page playback.

By the normal operation of a web browser, once received at point 440, web page source 165 is processed during time 450 by a web browser processing engine. During the period 450 when web page source 165 is processed, at point 445, dynamic instructions 624 are processed. Without the function replacement described above, based on the conventional Math.random function, at point 445, dynamic instructions 624 are likely to generate a different result than the previously delivered web page, based on some factor, for example the date or a random number. However, because of the modification described above, during processing at point 445, dynamic instruction 250 generates the same result each time web page source 165 is processed by client 135.

Because of the modifications described in this example, content requests 454 generated by interpretation 445 of dynamic instruction 250 are the same each time web page source 610 is processed.

Example Implementation

Figure 7:
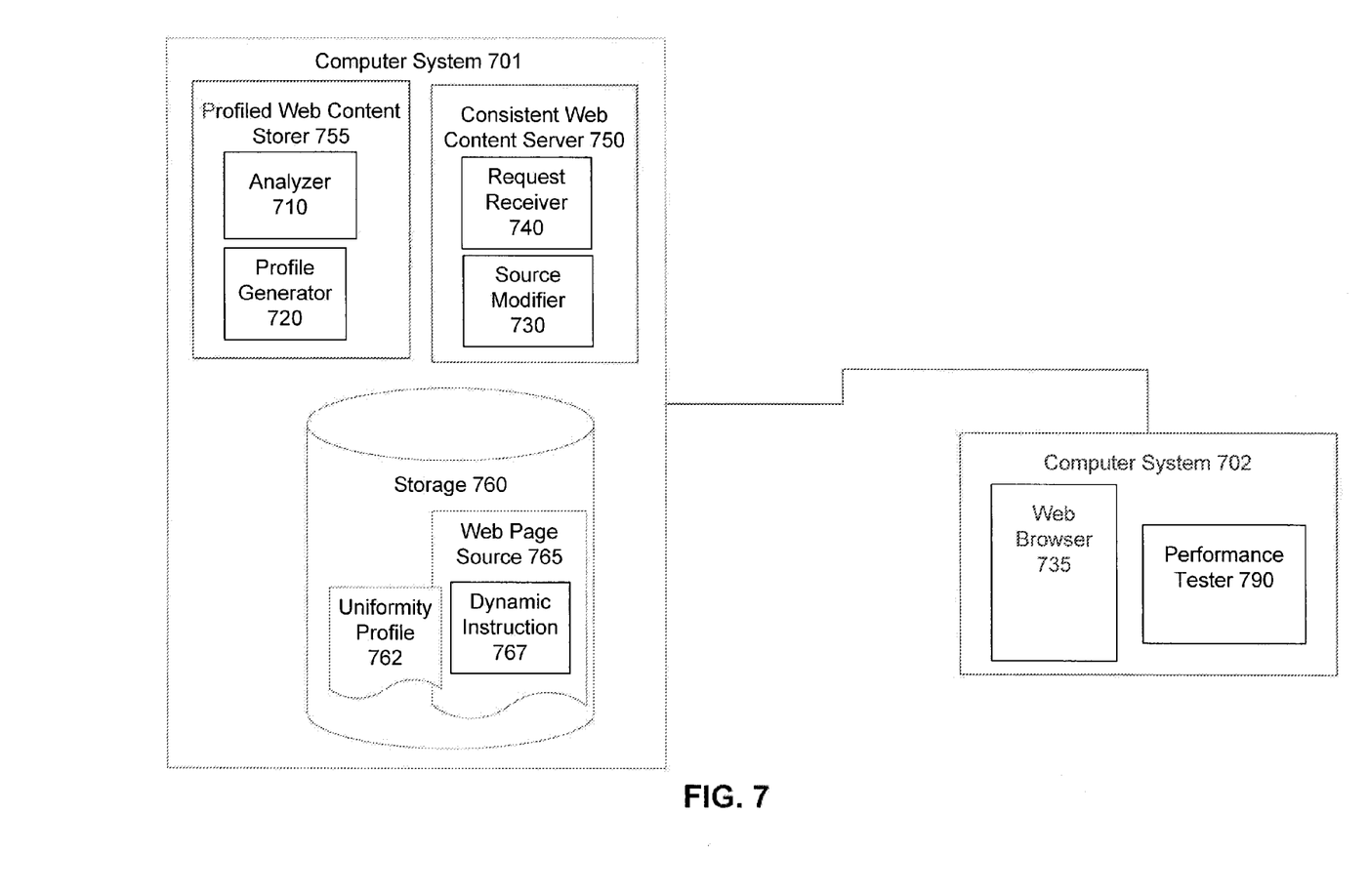
FIG. 7 is a block diagram of a consistent web content server and a client having a performance tester, according to some implementations.

FIG. 7 is a block diagram of an exemplary computer system 701 and computer system 702. Computer system 701 has a consistent web content server 750, storage 760 and a profiled web content storer 755. Profiled web content storer 755 includes analyzer 710 and profile generator 720. Consistent web content server 750 includes request receiver 740 and source modifier 730. Storage 760 includes uniformity profile 762 and web page source 765 having dynamic instruction 767. Computer system 702 includes web browser 735 and performance tester 790.

As described above, consistent performance testing of web-pages can be difficult due to the dynamic nature of some web pages that change their content upon each request. Implementations described herein provide an environment that reduces the dynamic nature of some web pages and thus improve the consistency of performance testing.

In some implementations, web browser 735 is monitored by performance tester 790. Performance tester 790 is a performance measuring application configured to measure performance metrics associated with web browser 735 and web page source 765. For example, performance tester 790 can be configured to measure the performance of web page source 765 as this source is loaded by web browser 735.

In an example, an original web page source (not shown) is stored in storage 760 by profiled web content storer 755 as web page source 765. Web page source 765 is analyzed by analyzer 710 to identify dynamic instruction 767. Based on the analyzing of analyzer 710, uniformity profile 762 is generated by profile generator 720 and stored in storage 760.

At web browser 735, a first request is made to retrieve web page source 765. Based on uniformity profile 762, dynamic instruction 767 is modified, resulting in a modified dynamic instruction. The first modified copy of web page source 765 is delivered to client web browser 735. Performance tester 790 monitors aspects of the request and delivery of web page source 765 to web browser 735.

At web browser 735, a second request is made to retrieve web page source 765. Based on uniformity profile 762, dynamic instruction 767 is modified again, resulting in a modified dynamic instruction that is equivalent to the dynamic instruction after the previous modification. The second modified copy of web page source 765 is delivered to client web browser 735. Performance tester 790 also monitors aspects of the request and delivery of web page source 765 to web browser 735.

Method 800

Figure 8:
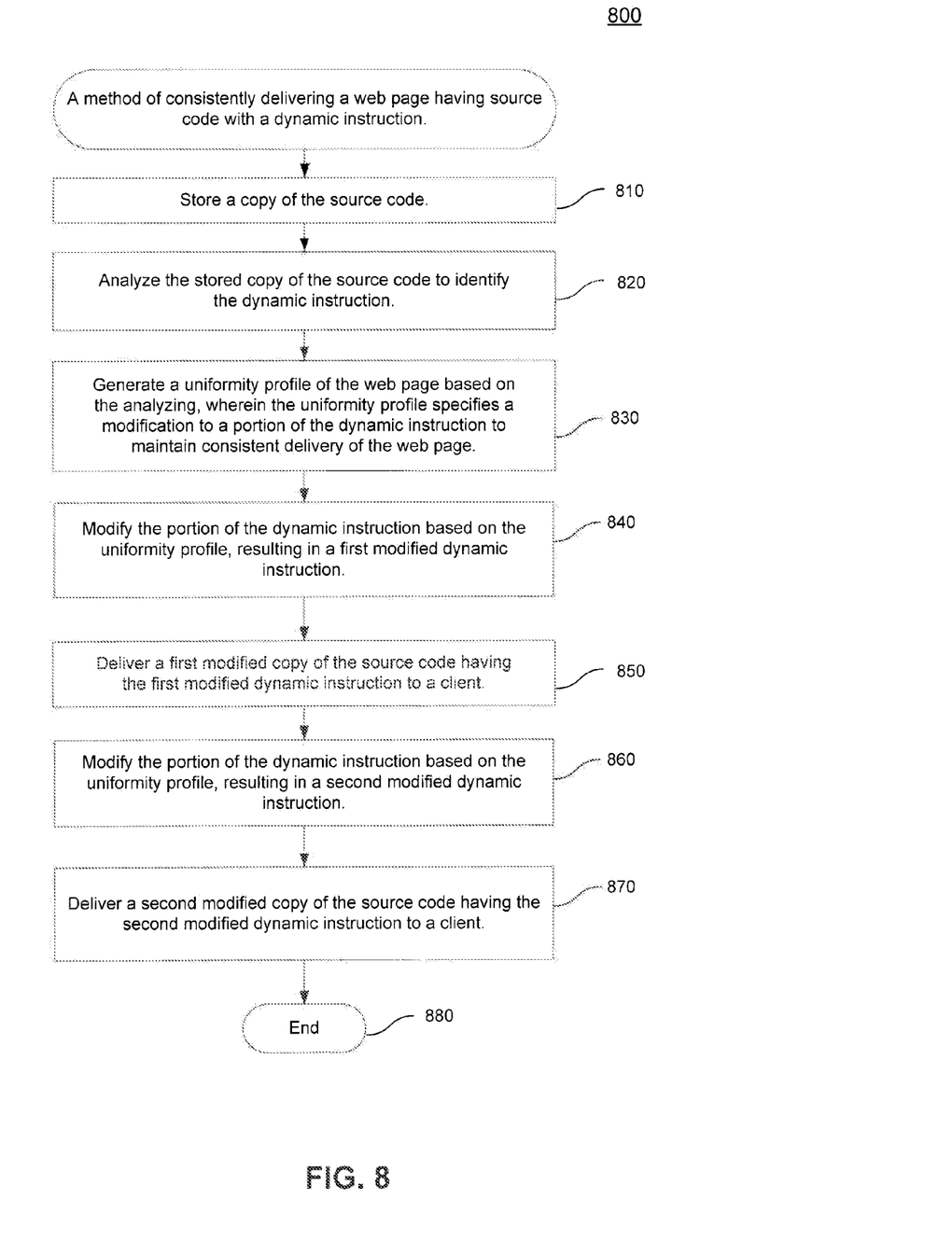
FIG. 8 is a flowchart illustrating a method of consistently delivering a web page having source code with a dynamic instruction, according to some implementations.

FIG. 8 is a flowchart illustrating a method of consistently delivering a web page having source code with a dynamic instruction, according to some implementations. The method begins at stage 810 with a copy of the source code being stored. For example, in FIG. 1, original web page source 115 is stored by profiled web content storer 155 in storage 160 as web page source 165. Once stage 810 is completed, the method moves to stage 820.

At stage 820, the stored copy of the source code is analyzed to identify the dynamic instruction. For example, in FIG. 2, web page source 165 is analyzed by analyzer 210 to identify dynamic instruction 250. Once stage 820 is completed, the method moves to stage 830.

At stage 830, a uniformity profile of the web page is generated based on the analyzing, wherein the uniformity profile specifies a modification to a portion of the dynamic instruction to maintain consistent delivery of the web page. For example, based on the analyzing of analyzer 210, uniformity profile 255 is generated by profile generator 220 and stored in storage 160. Once stage 830 is completed, the method moves to stage 840.

At stage 840, in response to a request for the web page, the portion of the dynamic instruction is modified based on the uniformity profile, resulting in a first modified dynamic instruction. For example, based on uniformity profile 255, dynamic instruction 250 is modified, resulting in a first modified dynamic instruction. Once stage 840 is completed, the method moves to stage 850.

At stage 850, a first modified copy of the source code having the first modified dynamic instruction is delivered to a client. For example, a first modified copy of web page source 165 is delivered to client 135. Once stage 850 is completed, the method moves to stage 860.

At stage 860, in response to another request for the web page, the portion of the dynamic instruction is modified based on the uniformity profile, resulting in a second modified dynamic instruction. For example, based on uniformity profile 255, dynamic instruction 250 is modified, resulting in a second modified dynamic instruction. Once stage 860 is completed, the method moves to stage 870.

At stage 870, a second modified copy of the source code having the second modified dynamic instruction is delivered to a client. For example, a second modified copy of web page source 165 is delivered to client 135. Once stage 870 is completed, the method ends at stage 880.

Example Computer System Implementation

Figure 9:
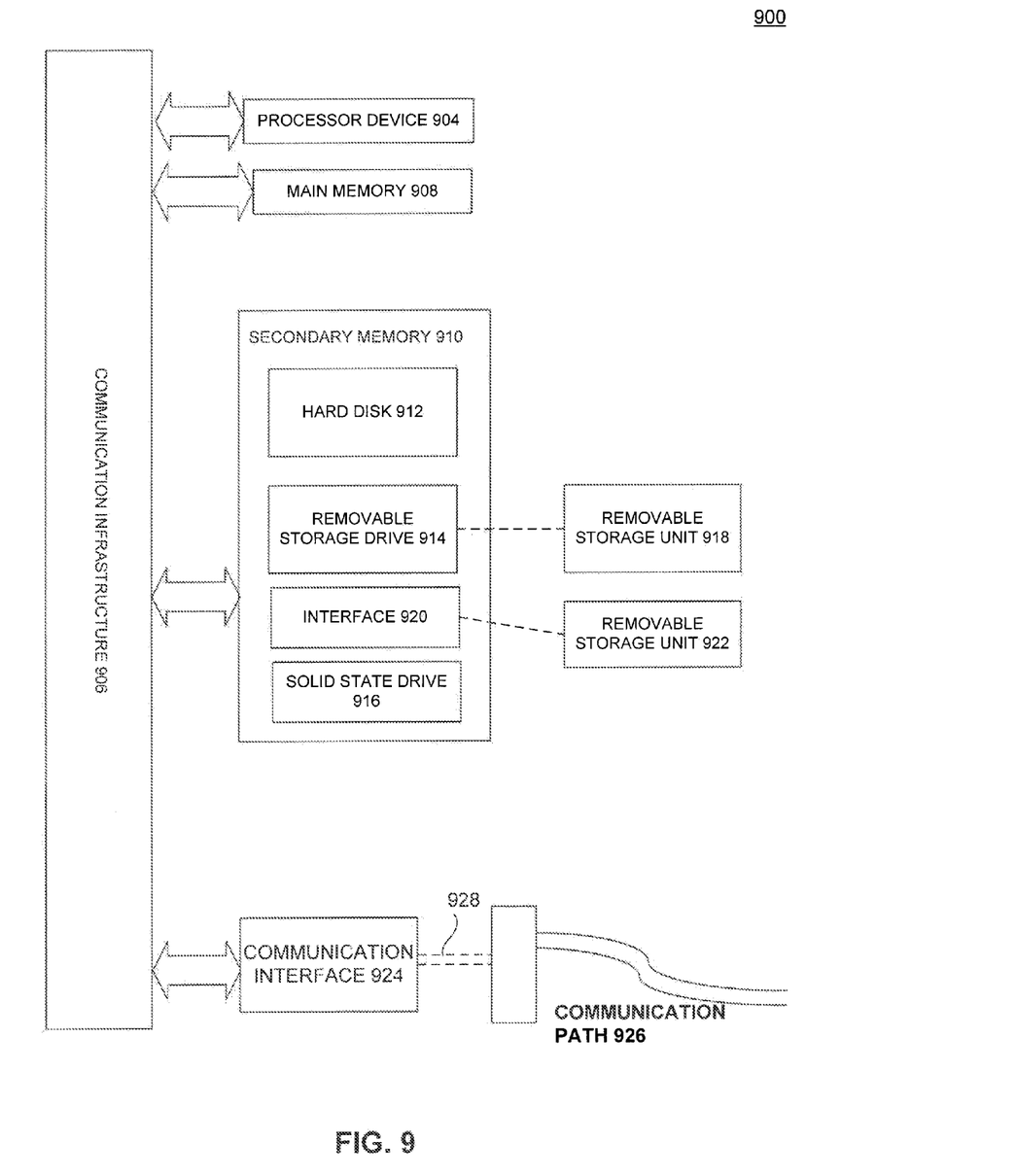
FIG. 9 is a sample computer system that may be used to implement some implementations.

FIG. 9 illustrates an example computer system 900 in which implementations of the present invention, or portions thereof, may be implemented. For example, portions of systems or methods illustrated in FIGS. 1-4 and 7 may be implemented in computer system 900 using hardware, software, firmware, tangible computer readable media having instructions stored thereon, or a combination thereof and may be implemented in one or more computer systems or other processing systems. Hardware, software or any combination of such may embody any of the modules/components in FIGS. 1-4 and 7, and any stage in FIG. 8. Computer systems 105, 120, 130, 701 and 702 can also be implemented using components of computer system 900.

If programmable logic is used, such logic may execute on a commercially available processing platform or a special purpose device. One of ordinary skill in the art may appreciate that implementations of the disclosed subject matter can be practiced with various computer system and computer-implemented device configurations, including smartphones, cell phones, mobile phones, tablet PCs, multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described implementations. A processor device may be a single processor, a plurality of processors, or combinations thereof. Processor devices may have one or more processor 'cores.'

Various implementations of the invention are described in terms of this example computer system 900. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some implementations the order of operations may be rearranged without departing from the spirit of the disclosed subject matter.

As will be appreciated by persons skilled in the relevant art, processor device 904 may be a single processor in a multi-core/multiprocessor system, such system operating alone, or in a cluster of computing devices operating in a duster or server farm. Processor device 904 is connected to a communication infrastructure 906, for example, a bus, message queue, network or multi-core message-passing scheme.

Computer system 900 also includes a main memory 908, for example, random access memory (RAM), and may also include a secondary memory 910. Secondary memory 910 may include, for example, a hard disk drive 912, removable storage drive 914 and solid state drive 916. Removable storage drive 914 may include a floppy disk drive, a magnetic tape drive, an optical disk drive, a flash memory, or the like. The removable storage drive 914 reads from and/or writes to a removable storage unit 918 in a well known manner. Removable storage unit 918 may include a floppy disk, magnetic tape, optical disk, etc. which is read by and written to by removable storage drive 914. As will be appreciated by persons skilled in the relevant art, removable storage unit 918 includes a computer usable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, or the like. Software and data transferred via communications interface 924 may be in electronic, electromagnetic, optical, or other forms capable of being received by communications interface 924. This data may be provided to communications interface 924 via a communications path 926. Communications path 926 carries the data and may be implemented using wire or cable, fiber optics, a phone line, a cellular phone link, an RF link or other communications channels.

In this document, the terms computer program medium and computer readable medium are used to generally refer to media such as removable storage unit 918, removable storage unit 922, and a hard disk installed in hard disk drive 912. Computer program medium and computer readable medium may also refer to memories, such as main memory 908 and secondary memory 910, which may be memory semiconductors (e.g., DRAMs, etc.).

Computer programs (also called computer control logic) may be stored in main memory 908 and/or secondary memory 910. Computer programs may also be received via communications interface 924. Such computer programs, when executed, enable computer system 900 to implement implementations of the present invention as discussed herein. In particular, the computer programs, when executed, enable processor device 904 to implement the processes of implementations, such as the stages in method 900 illustrated by FIG. 9 discussed above. Accordingly, such computer programs represent controllers of the computer system 900. When some implementations are implemented using software, the software may be stored in a computer program product and loaded into computer system 900 using removable storage drive 914, interface 920, hard disk drive 912 or communications interface 924.

Implementations of the invention also may be directed to computer program products comprising software stored on any computer readable medium. Such software, when executed in one or more data processing devices, causes a data processing device(s) to operate as described herein. Implementations of the invention employ any computer useable or readable medium. Examples of computer readable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

CONCLUSION

Implementations described herein relate to methods and apparatus for consistently delivering a web page having source code with a dynamic instruction. The summary and abstract sections may set forth one or more but not all exemplary implementations of the present invention as contemplated by the inventors, and thus, are not intended to limit the present invention and the claims in any way.

The implementations herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific implementations will so fully reveal the general nature of the invention that others may, by applying knowledge within the skill of the art, readily modify and/or adapt for various applications such specific implementations, without undue experimentation, without departing from the general concept of the present invention. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary implementations, but should be defined only in accordance with the claims and their equivalents.

What is claimed is:

1. A method of consistently delivering a web page having source code with a dynamic instruction, comprising:
   storing a copy of the source code;
   analyzing, by a computer, the stored copy of the source code to identify the dynamic instruction;
   generating, by a computer, a uniformity profile of the web page based on the analyzing, wherein the uniformity profile specifies a modification to a portion of the dynamic instruction that causes the web page to be delivered having the same content, in response to two or more requests for the web page;

modifying the portion of the dynamic instruction based on the uniformity profile, resulting in a first modified dynamic instruction;

delivering a first modified copy of the source code having the first modified dynamic instruction to a client;

modifying the portion of the dynamic instruction based on the uniformity profile, resulting in a second modified dynamic instruction; and delivering a second modified copy of the source code having the second modified dynamic instruction to a client.

2. The method of claim 1, further comprising, after the delivering of the first modified copy of the source code to the client:

processing the first modified copy of the source code using an application;

measuring a first performance metric associated with the processing, wherein after the delivering of the second modified copy of the source code to the client, processing the second modified copy of the source code using the application;

measuring a second performance metric associated with the processing; and comparing the first metric to the second metric.

3. The method of claim 2, wherein processing modified copies of the source code using an application comprises processing modified copies of the source code using a web browser application.

4. The method of claim 1, wherein modifying the portion of the dynamic instruction comprises, each time the source code is delivered, replacing a parameter value of the dynamic instruction with a replacement value.

5. The method of claim 4, wherein, replacing a parameter value comprises, replacing a parameter value that is, based on dynamic characteristics of the web page, configured to change for each of a first and second delivery of the web page.

6. The method of claim 1, wherein modifying the portion of the dynamic instruction comprises modifying a query string parameter of the dynamic instruction.

7. The method of claim 1, wherein modifying the portion of the dynamic instruction comprises modifying a JavaScript parameter of a JavaScript instruction.

8. The method of claim 1, wherein modifying the portion of the dynamic instruction comprises modifying a parameter associated with an HTTP GET instruction.

9. The method of claim 1, wherein modifying the portion of the dynamic instruction comprises modifying a portion of the dynamic instruction that is configured to change based on a current date or time.

10. The method of claim 1, wherein modifying the portion of the dynamic instruction comprises modifying a portion of the dynamic instruction that is configured to change based on a random value.

11. The method of claim 1, further comprising, before the analyzing of the source code, storing content referenced by the web page.

12. A method of consistently delivering a web page having source code with a dynamic function, comprising:

storing a copy of the source code;

analyzing, by a computer, the stored copy of the source code to identify the dynamic instruction;

generating, by a computer, a uniformity profile of the web page based on the analyzing, wherein the uniformity profile specifies a dynamic function to modify that causes the web page to be delivered having the same content, in response to two or more requests for the web page;

replacing the dynamic function with a replacement function based on the uniformity profile;

delivering a first copy of the web page with the first overridden dynamic function to a client;

overriding the dynamic function based on the uniformity profile; and delivering a second copy of the web page with the second overridden dynamic function to the client.

13. The method of claim 12, wherein, overriding the dynamic function comprises, overriding a dynamic function that is, based on dynamic characteristics of the web page, configured to produce a different result for each of a first and second execution of the dynamic function.

14. The method of claim 12, wherein overriding the dynamic function comprises overriding a JavaScript function.

15. The method of claim 12, wherein overriding the dynamic function comprises overriding a function that is configured to change based on a current date or time.

16. The method of claim 12, wherein overriding the dynamic function comprises overriding a function that is configured to change based on a current date or time, based on a random value.

17. The method of claim 12, further comprising storing web content referenced by the web page.

18. A system to consistently deliver a web page having source code with a dynamic instruction, comprising:

a profiled web content storer configured to store a copy of the source code;

an analyzer configured to analyze the stored copy of the source code to identify the dynamic instruction;

a profile generator configured to generate a uniformity profile of the web page based on the analyzing by the analyzer, wherein the uniformity profile specifies a modification to a portion of the dynamic instruction that causes the web page to be delivered having the same content, in response to two or more requests for the web page;

a source modifier configured to first modify the portion of the dynamic instruction based on the uniformity profile, resulting in a first modified dynamic instruction; and a consistent web content server configured to deliver a first modified copy of the source code having the first modified dynamic instruction to a client, wherein after the first modified copy is delivered;

the source modifier is configured to second modify the portion of the dynamic instruction based on the uniformity profile, resulting in a second modified dynamic instruction, and the consistent web content server is configured to deliver a second modified copy of the source code having the second modified dynamic instruction to a client.

19. A system to consistently deliver a web page having source code with a dynamic function, comprising:

a profiled web content storer configured to store a copy of the source code;

an analyzer configured to analyze the stored copy of the source code to identify the dynamic function;

a profile generator configured to generate a uniformity profile of the web page based on the analyzing, wherein the uniformity profile specifies a dynamic function to modify that causes the web page to be delivered having the same content, in response to two or more requests for the web page;

a source modifier configured to replace the dynamic function with a replacement function based on the uniformity profile, resulting in a modified web page source; and a consistent web content server configured to deliver the modified web page source to a client.

20. A non-transitory computer-readable medium having computer-executable instructions stored thereon that, when executed by a computing device, cause the computing device to perform a method of consistently delivering a web page having source code with a dynamic instruction, comprising:
  storing a copy of the source code;
  analyzing the stored copy of the source code to identify the dynamic instruction;
  generating a uniformity profile of the web page based on the analyzing, wherein the uniformity profile specifies a modification to a portion of the dynamic instruction that causes the web page to be delivered having the same content, in response to two or more requests for the web page;
  modifying the portion of the dynamic instruction based on the uniformity profile, resulting in a first modified dynamic instruction;
  delivering a first modified copy of the source code having the first modified dynamic instruction to a client;
  modifying the portion of the dynamic instruction based on the uniformity profile, resulting in a second modified dynamic instruction; and
  delivering a second modified copy of the source code having the second modified dynamic instruction to a client.

* * * * *